United States Patent
Chang et al.

(10) Patent No.: US 7,552,345 B2
(45) Date of Patent: Jun. 23, 2009

(54) IMPLEMENTATION OF STORING SECRET INFORMATION IN DATA STORAGE READER PRODUCTS

(75) Inventors: Robert C. Chang, Danville, CA (US); Ping Li, Santa Clara, CA (US); Farshid Sabet-Sharghi, San Jose, CA (US)

(73) Assignee: SanDisk Corporation, Sunnyvale, CA (US)

( * ) Notice: Subject to any disclaimer, the term of this patent is extended or adjusted under 35 U.S.C. 154(b) by 1348 days.

(21) Appl. No.: 10/092,049

(22) Filed: Mar. 4, 2002

(65) Prior Publication Data
US 2003/0167395 A1 Sep. 4, 2003

(51) Int. Cl.
*G06F 21/00* (2006.01)
*H04L 9/00* (2006.01)

(52) U.S. Cl. .................................. 713/193
(58) Field of Classification Search .......... 713/193, 713/189
See application file for complete search history.

(56) References Cited

U.S. PATENT DOCUMENTS

| | | | |
|---|---|---|---|
| 4,864,542 A * | 9/1989 | Oshima et al. | 365/189.01 |
| 4,960,982 A * | 10/1990 | Takahira | 235/382 |
| 5,058,162 A * | 10/1991 | Santon et al. | 705/51 |
| 5,533,125 A | 7/1996 | Bensimon et al. | |
| 5,623,637 A * | 4/1997 | Jones et al. | 711/164 |
| 6,012,146 A | 1/2000 | Liebenow | |
| 6,075,858 A * | 6/2000 | Schwartzman | 705/52 |
| 6,182,217 B1 * | 1/2001 | Sedlak | 713/172 |
| 6,282,651 B1 * | 8/2001 | Ashe | 713/193 |
| 6,557,104 B2 * | 4/2003 | Vu et al. | 713/189 |
| 6,859,535 B1 * | 2/2005 | Tatebayashi et al. | 380/201 |
| 2001/0039620 A1 * | 11/2001 | Berry et al. | 713/193 |
| 2001/0041593 A1 | 11/2001 | Asada | |
| 2002/0174351 A1 * | 11/2002 | Jeong et al. | 713/189 |

FOREIGN PATENT DOCUMENTS

| | | |
|---|---|---|
| EP | 0 537 925 A1 | 10/1992 |
| EP | 1 089 156 | 4/2001 |
| WO | WO 95/16238 | 6/1995 |

OTHER PUBLICATIONS

European Examination Report Mailed Mar. 18, 2008 for European Application No. 03744114.4.

* cited by examiner

*Primary Examiner*—Gilberto Barron, Jr.
*Assistant Examiner*—Samson B Lemma
(74) *Attorney, Agent, or Firm*—Brinks Hofer Gilson & Lione

(57) ABSTRACT

Methods and apparatus for enabling protected contents such as device keys to be stored on a reader are disclosed. According to one aspect of the present invention, a method for accessing a memory storage device that includes a memory and is coupled to a host system through an adapter, the memory storage device including a memory includes obtaining a key from the adapter. The key is suitable for encrypting information that is arranged to be stored in the memory, and is also suitable for decrypting the encrypted information. The method also includes processing the information using the key. In one embodiment, the information is stored in the memory, and the information that is stored in the memory is obtained by processing the information such that the information may be decrypted using the key.

17 Claims, 10 Drawing Sheets

| Bit<br>Byte | 7 | 6 | 5 | 4 | 3 | 2 | 1 | 0 |
|---|---|---|---|---|---|---|---|---|
| 0 | \multicolumn{8}{c}{Operation Code (D3h)} ||||||||
| 1 | Reserved ||||||||
| 2 | Password 1 ||||||||
| 3 | Password 2 ||||||||
| 4 | Password 3 ||||||||
| 5 | Password 4 ||||||||
| 6 | Password 5 ||||||||
| 7 | Password 6 ||||||||
| 8 | Password 7 ||||||||
| 9 | Password 8 ||||||||
| 10 | User Defined1 | User Defined2 | SD PW Method | CPRM | No Encrypt | Clear PW | Lock | ENB |
| 11 | Current Year ||||| Current Month || Current Day |

(Column labels above table: 910h, 910g, 910f, 910e, 910d, 910c, 910b, 910a)

Fig. 9a

| Bit<br>Byte | 7 | 6 | 5 | 4 | 3 | 2 | 1 | 0 |
|---|---|---|---|---|---|---|---|---|
| 0 | User Defined1 | User Defined2 | SD PW Method | CPRM | No Encrypt | Clear PW | Lock | ENB |
| 1 | 55h ||||||||
| 2 | Aah ||||||||

(Column labels above table: 930h, 930g, 930f, 930e, 930d, 930c, 930b, 930a)

Fig. 9b

| Byte \ Bit | 7 | 6 | 5 | 4 | 3 | 2 | 1 | 0 |
|---|---|---|---|---|---|---|---|---|
| 0 | Operation Code (D4h) ||||||||
| 1 | Reserved |||||| DIR ||
| 2 | Protected Content Address (MSB) ||||||||
| 3 | Protected Content Address (Middle Byte 2) ||||||||
| 4 | Protected Content Address (Middle Byte 1) ||||||||
| 5 | Protected Content Address (LSB) ||||||||
| 6 | Data Transfer Length (MSB) ||||||||
| 7 | Data Transfer Length (Middle Byte 2) ||||||||
| 8 | Data Transfer Length (Middle Byte 1) ||||||||
| 9 | Data Transfer Length (LSB) ||||||||
| 10 | Reserved ||||||||
| 11 | Expiration Year ||| Expiration Month ||| Expiration Day ||

Fig. 9c

| Bit<br>Byte | 7 | 6 | 5 | 4 | 3 | 2 | 1 | 0 |
|---|---|---|---|---|---|---|---|---|
| 0 | Operation Code (D4h) | | | | | | | |
| 1 | Reserved | | | | | | | DIR |
| 2 | Protected Content Address (MSB) | | | | | | | |
| 3 | Protected Content Address (Middle Byte 2) | | | | | | | |
| 4 | Protected Content Address (Middle Byte 1) | | | | | | | |
| 5 | Protected Content Address (LSB) | | | | | | | |
| 6 | Data Transfer Length (MSB) | | | | | | | |
| 7 | Data Transfer Length (Middle Byte 2) | | | | | | | |
| 8 | Data Transfer Length (Middle Byte 1) | | | | | | | |
| 9 | Data Transfer Length (LSB) | | | | | | | |
| 10 | Reserved | | | | | | | |
| 11 | Current Year | | | Current Month | | | Current Day | |

Fig. 9d

| Bit<br>Byte | 7 | 6 | 5 | 4 | 3 | 2 | 1 | 0 |
|---|---|---|---|---|---|---|---|---|
| 0-479 | colspan="8" Protected Contents |||||||||
| 480-487 | colspan="8" 8 Bytes Manufacturer ID in ASCII |||||||||
| 488-488 | colspan="8" Expiration Month |||||||||
| 489-489 | colspan="8" Expiration Day |||||||||
| 490-491 | colspan="8" Expiration Year |||||||||
| 492-500 | colspan="8" Reserved |||||||||
| 501-508 | colspan="8" 8 Bytes Encrypted Password |||||||||
| 509-510 | colspan="8" Content Updating Counter |||||||||
| 511-511 | colspan="8" Checksum |||||||||

Fig. 10

IMPLEMENTATION OF STORING SECRET INFORMATION IN DATA STORAGE READER PRODUCTS

BACKGROUND OF THE INVENTION

1. Field of Invention

The present invention relates generally to mass digital data storage systems. More particularly, the present invention relates to systems and methods for enabling a key, which substantially controls access to the contents of a memory card, to be stored separately from the memory card.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, hand-held personal computers, and global positioning devices. The ability to repetitively reprogram non-volatile memory included in flash memory storage systems enables flash memory storage systems to be used and reused.

A flash memory storage system or non-volatile memory device such as a flash card is often interfaced with a host system such as a personal computer. Referring initially to FIG. 1, a general host system that includes a non-volatile memory device will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 is generally a removable non-volatile memory device that interfaces with bus 104 to store information. Typically, non-volatile memory device 120 communicates with bus 104 through an interface 130. Interface 130 may serve to reduce loading on bus 104, as will be understood by those skilled in the art. Interface 130 may generally be a reader or an adaptor.

Non-volatile memory device 120 includes non-volatile memory 124 and a memory control system 128. Non-volatile memory device 120 may be implemented on a single chip or a die. Alternatively, non-volatile memory device 120 may be implemented on a multi-chip module, or on multiple discrete components which may be used together as non-volatile memory device 120.

Non-volatile memory 124, or core, is arranged to store data such that data may be accessed and read as needed. Data stored in non-volatile memory 124 may also be erased as appropriate, although it should be understood that some data in non-volatile memory 124 may not be erased. The processes of storing data, reading data, and erasing data are generally controlled by memory control system 128. Memory control system 128 may manage the operation of non-volatile memory 124.

While non-volatile memory device 120 has generally been described as including a memory control system 128, i.e., a memory controller, it should be understood that not all non-volatile memory devices include a controller. In general, non-volatile memory devices may include, but not limited to, PC cards, Compact Flash cards, Multi Media cards, Secure Digital cards, Smart Media cards, and Memory Stick cards.

Typically, in order to protect the contents of non-volatile memory device 120, e.g., from an individual who may wish to access information stored in non-volatile memory 124 to which he is not entitled, keys or passwords are often implemented with respect to either or both non-volatile memory device 120 and software (not shown) that runs on host 100 to allow access to non-volatile memory 124. FIG. 2 is a diagrammatic representation of a host computer system, an interface, and a memory device with protected contents. A computer system 202 generally communicates with a memory card 220 through a reader 230 or an interface. Reader 230 typically serves as an interface between computer system 202 and memory card 220 to enable computer system 202 to store data in a memory 224 of memory card 220 and to retrieve data from memory 224. That is, when computer system 202 communicates with memory card 220 to transfer data between computer system 202 and memory card 220, the communications take place through reader 230. Reader 230 may include a port or a receptacle (not shown) which enables memory card 220 to communicably interface with reader 230 such that reader 230 may enable communications to be made between memory card 220 and computer system 202.

Memory card 220 includes both memory 224 and a controller 228. Memory 224 may include storage elements, blocks, or cells which store bits of information. Controller 228 interfaces with memory 224 to facilitate the storage of and retrieval of data from memory 224. Reader 230, which, for example, may be a Universal Serial Bus (USB) reader or a personal computer (PC) card reader, includes reader firmware 232 which allows reader 230 to run instructions associated with the operation of reader 230.

Memory 224 is arranged to store a key 240 which is used to access or, if appropriate, decrypt contents stored in memory 224. A user which wishes to access the contents of memory 224 may run software 242 on computer system 202 which allows the user to enter a password. Key 240 is then accessed, and when the entered password is consistent with key 240, access to the contents of memory 224 is granted. In some cases, the contents of memory 224 are then decrypted using key 240. Alternatively, a key 250 may optionally be stored in software 242 such that when key 250 is determined to substantially match key 240, or is otherwise determined to be appropriate for use in accessing the contents of memory 224, access to the contents of memory 224 is granted. Typically, the contents of memory 224 are decrypted using key 240 or key 250, as appropriate.

With reference to FIG. 3, the steps associated with accessing a memory card that is effectively password protected will be described. A process 300 of accessing memory contained in a memory card begins at step 304 in which a memory card is placed in a reader that is connected to a computer. Then, in step 308, software on the computer which allows the computer to access the memory card through the reader is executed. Typically, a password is entered into the software in step 312. A determination is made in step 316 regarding whether the entered password is valid, i.e., whether the entered password is consistent with or allows access to a key associated with contents of the memory card.

If it is determined in step 316 that the password is valid, then process flow proceeds to step 324 in which access to the memory of the memory card and, hence, the contents of the memory, is allowed. Once access is allowed, the process of accessing the memory is completed. Alternatively, if it is determined in step 316 that the password is not valid, then the indication is that access to the memory in the card is not allowed. As such, a determination is made in step 320 as to whether the attempt to access the memory card is to be aborted. If it is determined that the attempt is not to be aborted, then process flow returns to step 312 in which a password is entered. If it is determined that the attempt is to be aborted, then the process of access the memory is effectively terminated.

FIG. 4 is a process flow diagram which illustrates the steps associated with accessing a memory card by matching keys. A process 400 of accessing memory begins at step 404 in which a memory card is placed in a reader that is in communication with a computer. Once the memory card is placed in the reader, software is executed on the computer to attempt to access the memory card in step 408. In step 412, the key that is stored on the computer, e.g., in the software, is located or otherwise accessed. After the key that is stored on the computer is located, the key that is stored in the memory of the memory card is located in step 416. The keys are then compared in step 420 in order to ascertain whether the keys match. If it is determined that the keys match, then access to the contents of the memory of the memory card is effectively allowed in step 424, and the process of accessing memory is completed. Alternatively, if it is determined that the keys do not match in step 420, the indication is that access to the memory is denied, and an error message is generated in step 428. Once the error message is generated, the process of accessing memory is effectively completed.

Protecting the contents of a memory card by requiring a valid password or a matching key is generally effective in preventing unauthorized individuals from accessing the contents. However, unauthorized individuals, e.g., "hackers," may obtain access to the key stored on the memory card and, hence, gain access to the contents of the memory card. Such individuals may also steal or otherwise obtain access to a key stored in software or hardware on a computer. In other words, keys or password information stored on either a memory card or a computer may obtained by an unauthorized individual if the individual is diligent enough to hack into the memory card or the computer.

Therefore, what is desired is a system which enables contents of a memory card to be protected such that a key which effectively enables access to the contents is not likely to be successfully obtained by an unauthorized individual. Specifically, what is needed is a system and a method which allows a password or a key which essentially protects the contents of a memory card to be stored in a reader, and not in a memory card.

SUMMARY OF THE INVENTION

The present invention relates to a system and a method for enabling protected contents such as device keys to be stored on a reader. According to one aspect of the present invention, a method for accessing a memory storage device that includes a memory and is coupled to a host system through an adapter, the memory storage device including a memory includes obtaining a key from the adapter. The key is suitable for encrypting information that is arranged to be stored in the memory, and is also suitable for decrypting the encrypted information. The method also includes processing the information using the key. In one embodiment, the information is stored in the memory, and the obtaining the information that is stored in the memory by processing the information such that the information may be decrypted using the key.

In another embodiment, obtaining the key from the adapter includes providing a first password to the adapter, determining when the first password is valid, and decoding contents associated with the adapter using the first password when it is determined that the first password is valid. The contents include the key and decoding the contents includes substantially identifying the key. In such an embodiment, determining when the first password is valid may include comparing the first password to a second password to determine if the first password is substantially the same as the second password which is stored on the adapter.

Storing protected information or contents such as keys on a reader, rather than in a memory card or on a host computer, generally increases the security of the memory card. For example, when a key is stored on a host computer, an experienced unauthorized user or hacker may be able to readily identify the key and, hence, decrypt information stored on the memory card. Similarly, when a key is stored in a memory card, the key may be obtained by downloading the contents of the memory card and breaking down the contents to identify the key. By storing a key on a reader such that the memory card which uses the key may not be "unlocked" unless the memory card is interfaced with the reader, the likelihood that the information stored in the memory card may be obtained in an unauthorized manner may be reduced. In addition, the reader may be more difficult to hack and, as a result, a hacker may be less likely to be able to obtain a key.

According to another aspect of the present invention, a system includes a memory storage device that includes a memory, and an adapter that interfaces with the memory storage device, and stores a key that is associated with the memory storage device. In one embodiment, the system also includes a host that communicates with the memory storage device through the adapter. In such an embodiment, the host also includes a means or a mechanism for accessing the key.

According to still another aspect of the present invention, a reader includes a receptacle that receives a memory card, an interface being that enables the reader to communicate with a host, and an area that stores contents which are substantially password-protected. In one embodiment, the contents include a key that enables information to be substantially written to or substantially read from the memory card. In another embodiment, the reader includes a password processing arrangement that receives a password through the interface. When the password is appropriate, the contents are arranged to be retrieved from the area through the interface by the host.

In accordance with yet another aspect of the present invention, a method for accessing protected contents on a reader that is in communication with a host and is arranged to receive a memory card includes determining when functionality associated with supporting the protected contents is enabled on the reader, as well as accessing a section of the reader that is arranged to store protected contents when it is determined that the functionality associated with supporting the protected contents is enabled.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 9a is a diagrammatic representation of a command descriptor block for a Check Protected Contents Status command in accordance with an embodiment of the present invention.

FIG. 9b is a diagrammatic representation of a data structure that may be returned to a host in response to a Check Protected Contents Status command in accordance with an embodiment of the present invention.

FIG. 9c is a diagrammatic representation of a command descriptor block for an Access Protected Contents command that is suitable for writing protected contents onto a reader in accordance with an embodiment of the present invention.

FIG. 9d is a diagrammatic representation of a command descriptor block for an Access Protected Contents command that is suitable for reading protected contents from a reader in accordance with an embodiment of the present invention.

FIG. 10 is a diagrammatic representation of a suitable format for protected contents within a reader in accordance with an embodiment of the present invention.

DETAILED DESCRIPTION OF THE EMBODIMENTS

Figure 1:
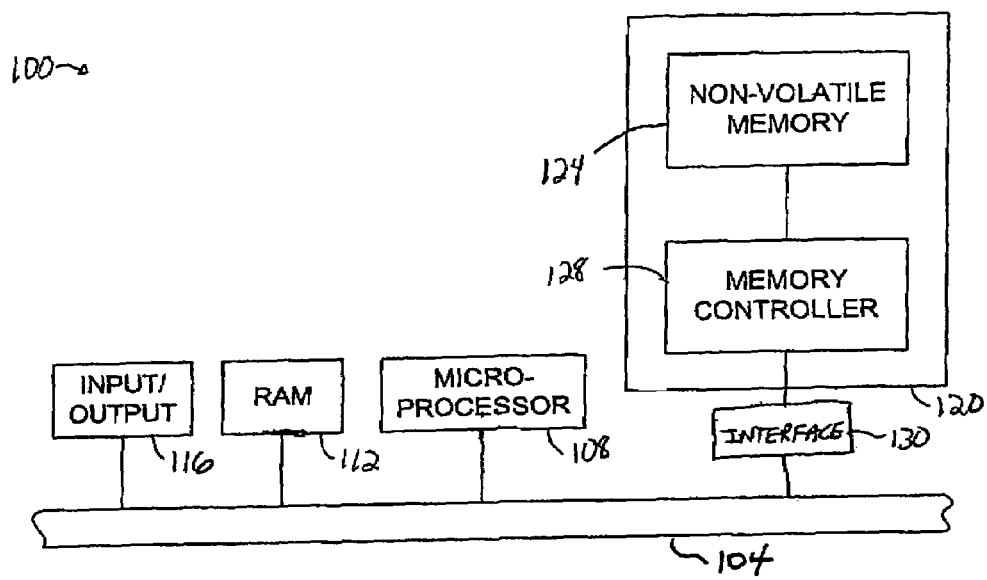
FIG. 1 is a diagrammatic representation of a general host system which includes a non-volatile memory device.
Figure 2:
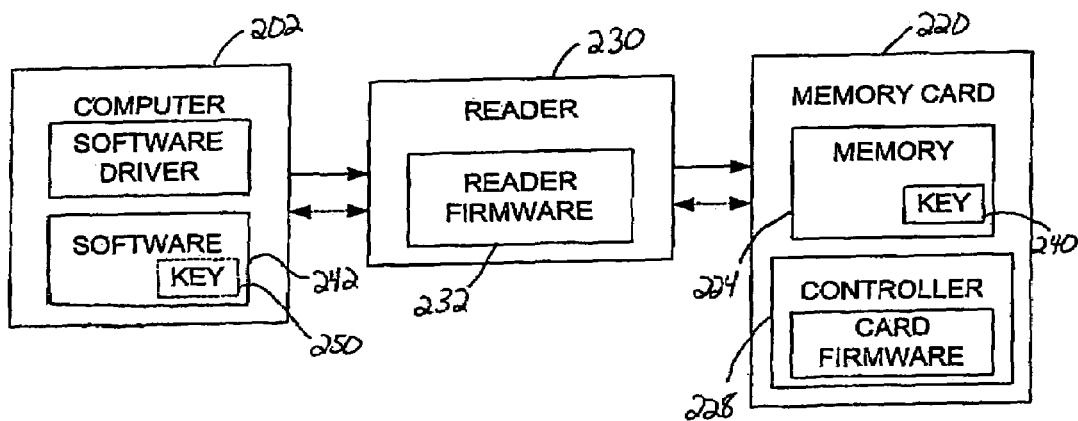
FIG. 2 is a diagrammatic representation of a host computer system, an interface, and a memory device with protected contents.
Figure 3:
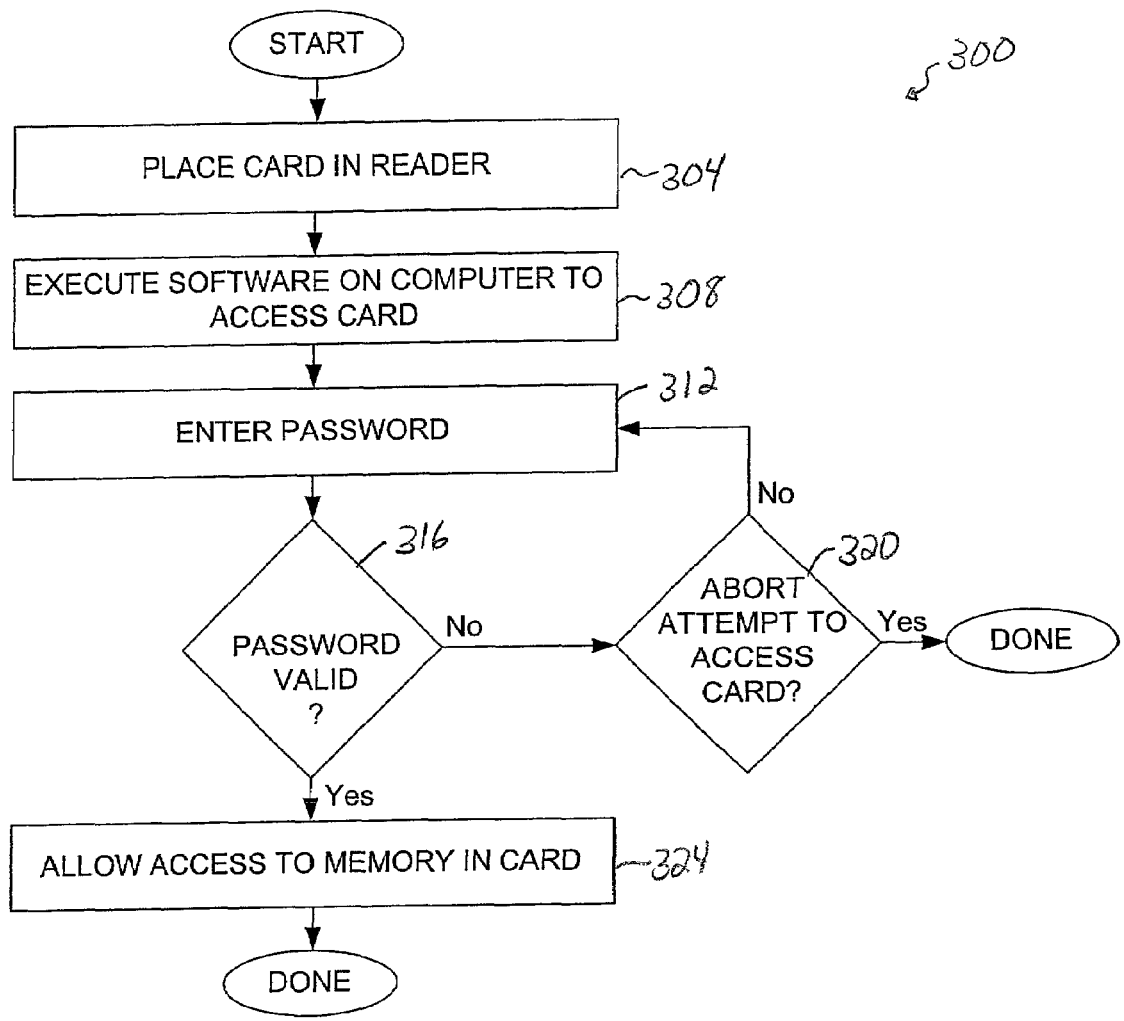
FIG. 3 is a process flow diagram which illustrates the steps associated with accessing a memory card that is effectively password protected will be described.
Figure 4:
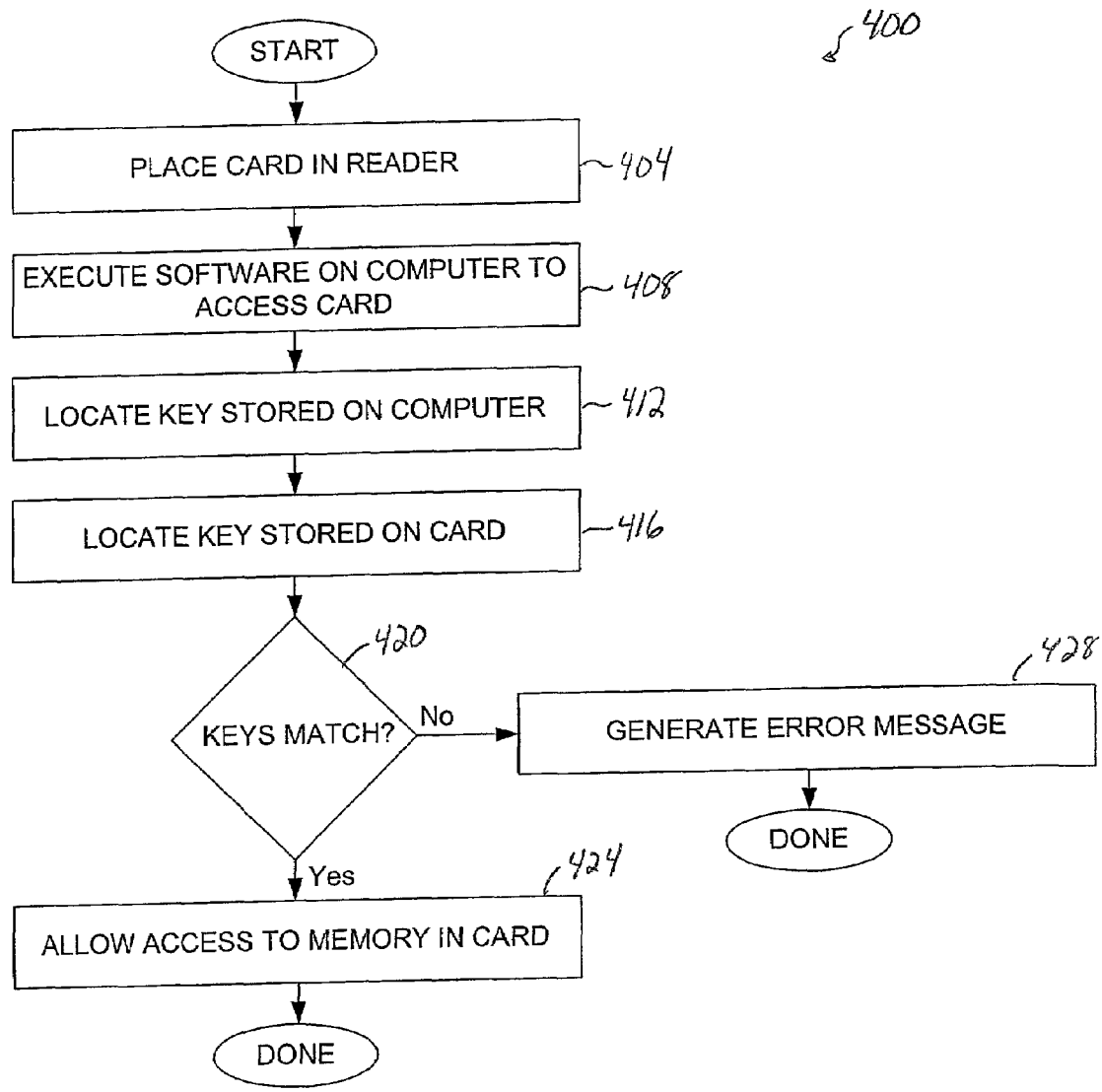
FIG. 4 is a process flow diagram which illustrates the steps associated with accessing a memory card by matching keys.

By storing a key that may be used to decrypt or otherwise decode data stored on memory card away from both the memory card and software which accesses the memory card, the likelihood that data stored on the memory card may be obtained by unauthorized individuals may be reduced. In other words, when a key is not stored either on a memory card or in software on a computer, it becomes more difficult for an unauthorized individual to identify the key and, hence, decode data that is stored on the memory card using the key.

A reader or an adapter, e.g., a universal serial bus (USB) reader or a Personal Computer Memory Card International Association (PCMCIA), may be configured to store protected contents such as a key that essentially protects information stored in the memory of a memory card. Such protected or special contents may be stored into the reader or, more specifically, memory associated with the reader, by a computer host. When the host attempts to access a memory card, the host may first obtain access to the protected contents of the reader to obtain a key, then use the key to read contents from or write contents to the memory card. Often, the protected contents may be stored on the reader by a manufacturer of the reader who provides both the reader and a memory card which is associated with the reader, i.e., a memory card which uses the key stored in the reader.

Using a reader which stores protected contents such as keys provides security for data stored on a memory card by preventing anyone who accesses the memory card using a different reader from being able to relatively easily locate a key which may be used to decode the data. Further, storing keys on a reader rather than in software which runs on a computer host may effectively prevent someone who is capable of reverse engineering the software from locating keys. As such, the data stored on the memory card is substantially protected from any user who does not have access to the reader which stores the key or keys that may be used to decode the data. In other words, storing keys on a reader rather than in host software or a memory card generally renders it harder for the keys to be hacked or stolen.

Protected contents which are stored in a protected contents section of a reader may generally include substantially any information. That is, the protected contents stored on a reader may include keys as well as other types of information, e.g. personal information which pertains to a user of the reader or substantially any information which a vendor or a manufacturer of the reader wishes to protect. Other types of information may also include, but is not limited to, random number seed information which enables random numbers to be generated for Secure Digital card application software. In general, a single password may be used to access both keys and other types of information.

The contents which are stored in a protected contents section of a reader may be encrypted prior to being sent to the reader. As a result, when a host retrieves the contents from the reader, encrypted information will be present on the interface bus. It should be noted that the password used to access the information is not encrypted on the bus because a user provides the password, and knows whether the value is right or wrong.

Figure 5:
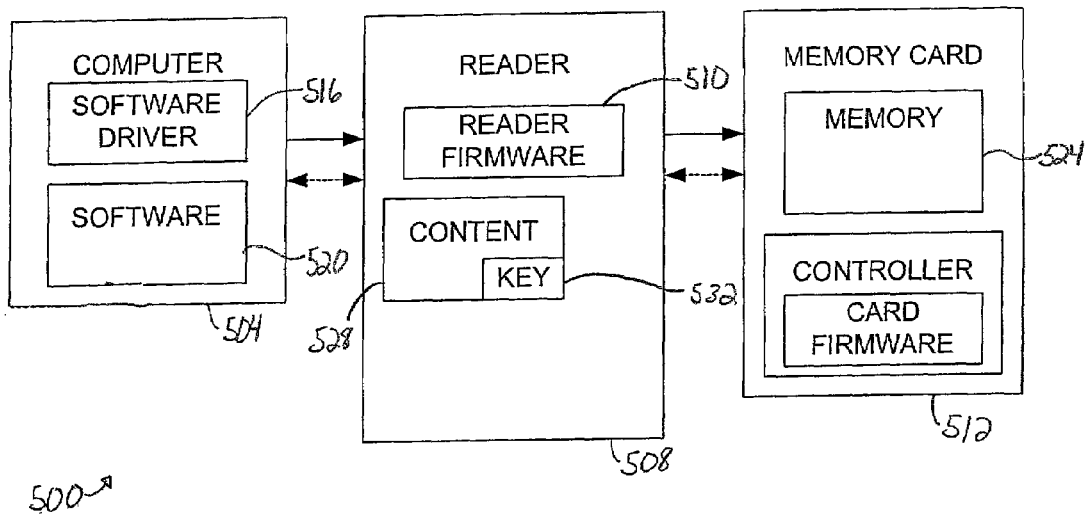
FIG. 5 is a diagrammatic representation of a system in which a reader includes protected contents in accordance with an embodiment of the present invention.

In one embodiment, protected contents which are stored on a reader may be accessed by a computer using a password. That is, contents stored on a reader may be password-protected. FIG. 5 is a diagrammatic representation of a system in which a reader includes protected contents in accordance with an embodiment of the present invention. A system includes a computer system or a host 504, an adapter or a reader 508, and a memory card 512. In general, reader 508 may be substantially any interface, e.g., a USB reader, which enables host 504 to substantially communicate with card 512 when card 512 is interfaced with reader 508. Card 512 may be substantially any suitable non-volatile memory card or device which is compatible with reader 508. Card 512 may be, but is not limited to being, a PC card, a Compact Flash card, a Multi Media card, a Secure Digital card, a Smart Media card, a Memory Stick card, or substantially any card which includes flash memory.

Host 504, which generally includes a software driver 516 and software 520 which enables host 504 to communicate with reader 508, typically accesses reader 508 when access to memory 524 associated with card 512 is desired. Software 520 may accept a password entered into host 504, e.g., by a user, and provide the entered password to reader 508 which then compares the entered password to a password stored in reader 508. When the entered password is accepted, or deemed to be valid, then protected contents 528 may be provided to software 520. When protected contents 528, which often include a key 532, are encrypted, are received by software 520, key 532 may then be used to enable computer 504 to access memory 524 through reader 508, as will be appreciated by those skilled in the art.

In addition, when host 504 is arranged to update protected contents 528, host 504 may communicate with reader 508 to store or write updated protected contents 528 onto reader 532. By way of example, host 504 may update a password stored in protected contents 528.

A password provided by software 520 to reader 508, in one embodiment, may be used to decrypt another password within reader 508 that, when decrypted, allows protected contents 528 to be accessed. Using an entered password to decrypt a password within reader 508, as for example through functionality included in firmware 510 of reader 508, that allows access to protected contents 528 further reduces the likelihood that a hacker or other unauthorized individual may be able to access protected contents 528, as the password stored on reader 508 is encrypted.

Figure 6:
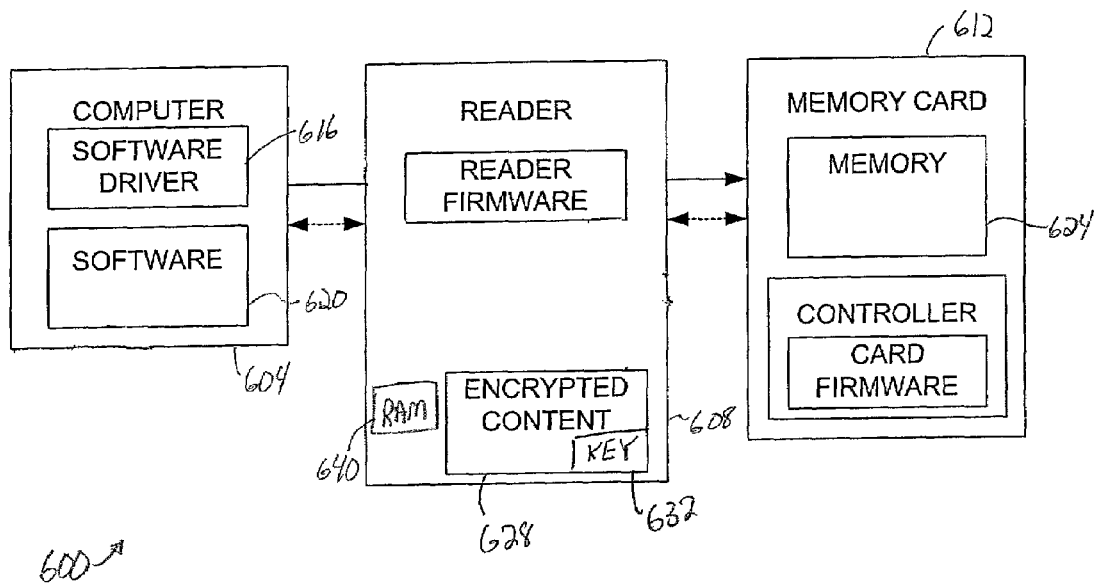
FIG. 6 is a diagrammatic representation of a system which includes a reader that has protected contents and uses a password mechanism in accordance with an embodiment of the present invention.

Protected contents stored within a reader may be encrypted using a password mechanism. FIG. 6 is a diagrammatic representation of a system which includes a reader that has protected contents and uses a password mechanism in accordance with an embodiment of the present invention. A password mechanism, e.g., a "SanDisk password mechanism," may be arranged to prevent a password which allows access to the protected contents from being stored on a reader 608 that is a part of system 600. Protected contents 628, which typically include a key 632, are generally encrypted using a particular password. When a host 604 attempts to access a memory card 612, software 620 on host 604 may download or provide a password, e.g., an entered password, into a random access memory (RAM) 640 of reader 608. Reader 608 may then decode or decrypt encrypted protected contents 628 using the entered password that is downloaded into RAM 640.

As will be appreciated by those skilled in the art, when the entered password is held in RAM 640, when power to reader 608 is removed, the entered password is not retained within RAM 640. Hence, a hacker who obtains reader 608 may not be able to readily determine how to access protected contents 628. When no password information is effectively stored in reader 608, both an owner of reader 608 and a vendor who manufactured reader 608 may maintain the password information.

When the entered password is substantially the same as the particular password which was used to encrypt protected contents 628, protected contents 628 are decrypted correctly, and host 604 may obtain key 632 for use in accessing a memory 624 of card 612. Alternatively, when the entered password does not match the particular password which was used to encrypt protected contents 628, improperly decrypted protected contents 628 may be provided to host 604. However, host 604 or, more particularly, software 620, may not be able to access data stored in memory 624, as key 632 will generally not be usable when the entered password is not correct.

Figure 7A:
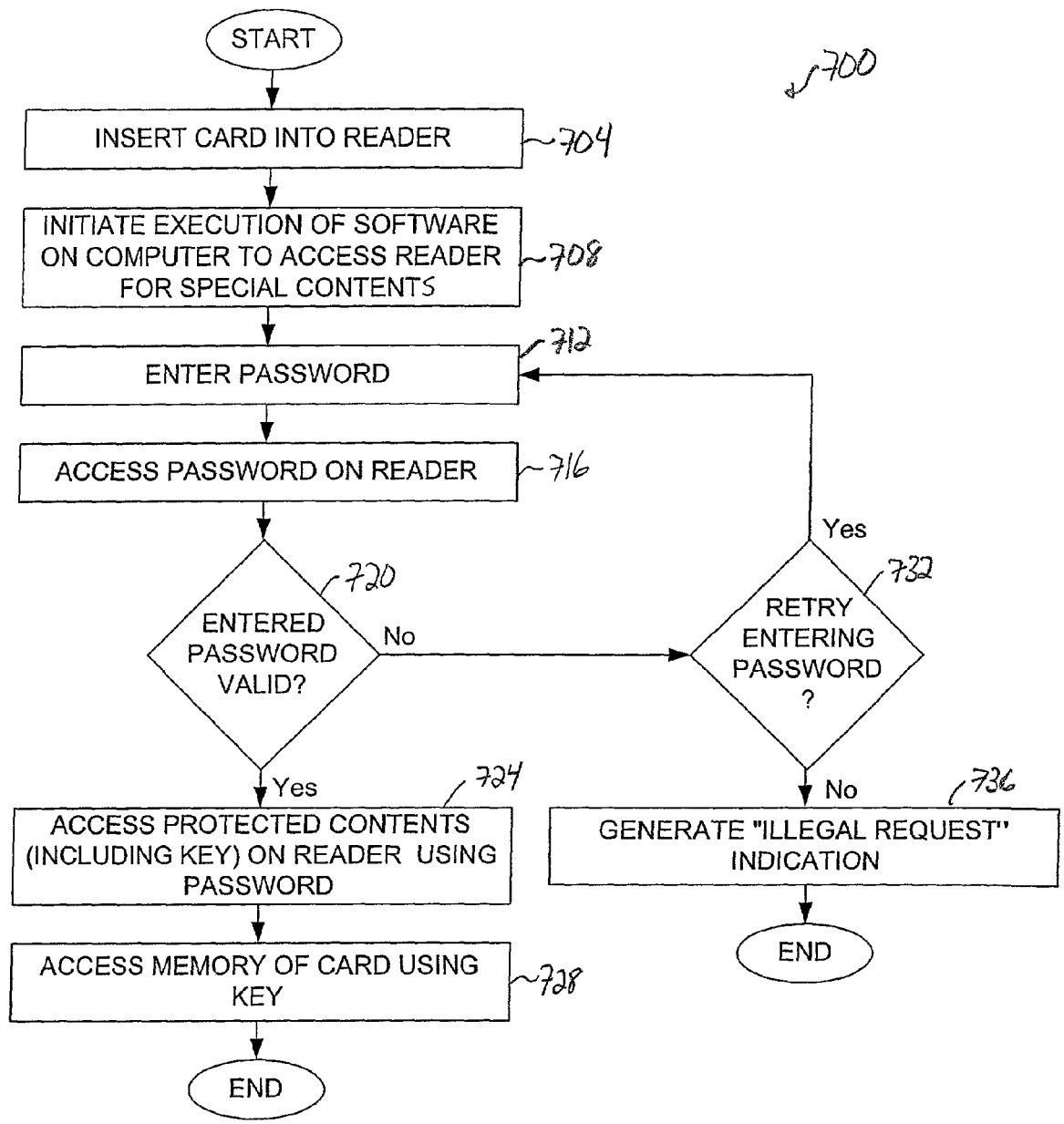
FIG. 7a is a process flow diagram which illustrates the steps associated with accessing a memory card using protected contents within a reader in accordance with an embodiment of the present invention.

FIG. 7a is a process flow diagram which illustrates the steps associated with accessing a memory card using protected contents within a reader in accordance with an embodiment of the present invention. A process 700 of accessing the contents of a memory card such as card 612 of FIG. 6 begins at step 704 in which the card is inserted into a reader, i.e., a reader that is in communication with or is a part of a host system such as a computer system. The reader, in the described embodiment, includes a Protected Contents Command Feature set that enables the reader to store protected contents. Although a compatibility check may be performed to ascertain whether the card is compatible with the reader, such a check is not included in process 700 for ease of discussion. It should be appreciated, however, that a compatibility check may generally be included.

Once the card is inserted into the reader, as for example into a card receiving receptacle on the reader, the execution of software on the computer system which enables the computer to access the reader for special or protected contents stored on the reader is initiated in step 708. That is, execution of software which interfaces with the reader that has a Protected Contents Command Feature set is initiated. During the execution of the software, a user may enter a password in step 712 in response to prompting from the software. Entering a password may include sending a Check Protected Contents Status command, which will be described below with respect to FIG. 9a, from the computer to the reader. After the password is entered, a corresponding password that is stored on the reader is accessed in step 716. A comparison is then made in step 720 regarding whether the entered password is valid. In other words, it is determined by the reader whether the entered password substantially matches the password stored on the reader.

If it is determined in step 720 that the entered password is valid, then the indication is that protected contents stored on the reader may be retrieved. Typically, a status is returned by the reader to indicate that the entered password is valid. Accordingly, process flow proceeds to step 724 in which the special or protected contents, often including a key, on the reader are accessed using the password. In one embodiment, accessing the protected contents may include decrypting the protected contents. Typically, the protected contents may be accessed using an Access Protected Contents command. Examples of Access Protected Contents commands will be described below with reference to FIGS. 9c and 9d.

After the protected contents on the reader are accessed, the memory of the card is accessed through the reader in step 728. That is, the memory of the card is accessed using the key that was stored with the protected contents on the reader. Using the key to access the memory of the card may allow the contents of the card to be decrypted using the key during a read process, or may allow contents to be stored on the card to be encrypted using the key during a write process. The steps associated with a read process will be described below with respect to FIG. 7b, while the steps associated with a write process will be described below with respect to FIG. 7c. Once the memory of the card is accessed, the process of accessing the contents of a card is completed.

Returning to step 720, when it is determined that the entered password is not valid, then the indication is that the protected contents stored on the reader are not to be accessed. As such, process flow moves from step 720 to step 732 in which a determination is made regarding whether to allow another attempt at entering a password. In one embodiment, a user may be given approximately two or three chances to enter a valid password, although the number of attempts at entering a password may vary widely. If it is determined in step 732 that another attempt at entering a password is to be allowed, then process flow returns to step 712 in which a password is entered. On the other hand, if it is determined that another attempt at entering a password is not to be allowed, then an "illegal request" indication is generated in step 736, and the process of accessing the contents of a card is effectively completed.

Figure 7B:
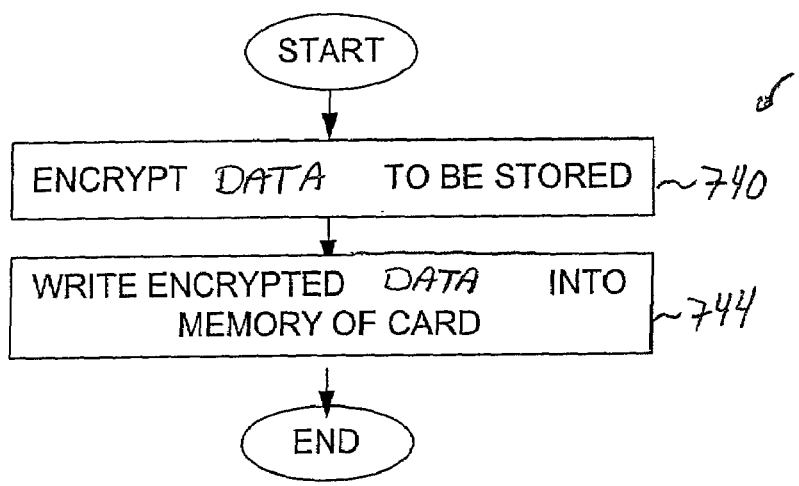
FIG. 7b is a process flow diagram which illustrates the steps associated with accessing the memory of a card, e.g., step 728 of FIG. 7a, to write information into the memory in accordance with an embodiment of the present invention.

In general, the memory of a card may be accessed to enable information to be written or otherwise stored as contents of the memory. The memory of the card may also be accessed to read or otherwise retrieve the contents of the memory. FIG. 7b is a process flow diagram which illustrates the steps associated with accessing the memory of a card, e.g., step 728 of FIG. 7a, to write information into the memory in accordance with an embodiment of the present invention. A writing process 728' begins at step 740 in which the data that is to be stored on a card is encrypted using a key that was stored on the reader within which the card is inserted. The data may be encrypted using substantially any suitable method. In one embodiment, the data that are to be stored are encrypted using either a user-defined method or a Copy Protection for Recordable Media (CPRM) method. Once the data is encrypted, the encrypted data is written into the memory of the card in step 744, and the process of writing information into memory is completed.

Figure 7C:
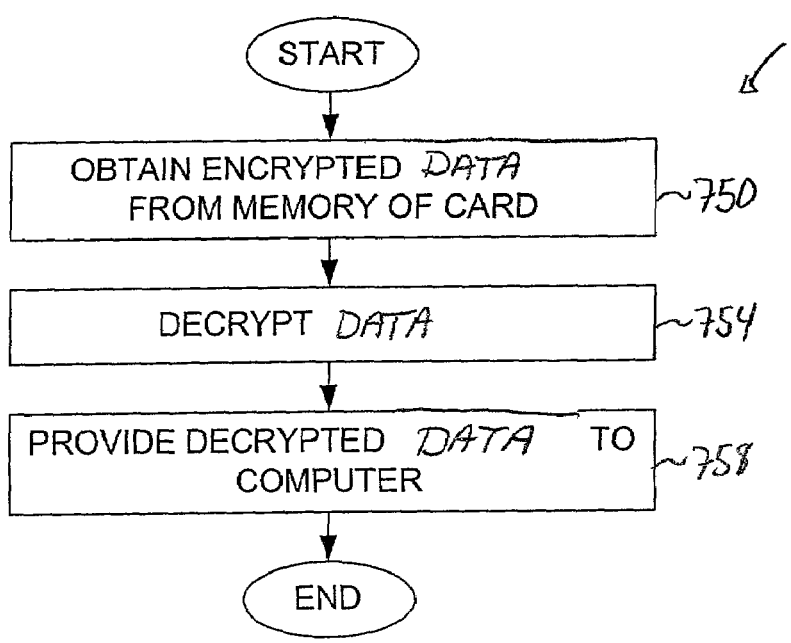
FIG. 7c is a process flow diagram which illustrates the steps associated with accessing the memory of a card, e.g., step 728 of FIG. 7a, to read at least some of the data in the memory in accordance with an embodiment of the present invention.

FIG. 7c is a process flow diagram which illustrates the steps associated with accessing the memory of a card, e.g., step 728 of FIG. 7a, to read at least some of the data in the memory in accordance with an embodiment of the present invention. A reading process 728" begins at step 750 in which data is obtained from the memory of the card, e.g., by the reader in response to a request from a computer host. Typically, the data that is obtained is encrypted. After the encrypted data is obtained, the encrypted data is decrypted in step 754 using a key, i.e., the key that was obtained in step 724 of FIG. 7a. Once the data is decrypted, as for example by the reader, the decrypted data is provided to the computer in step 758, and the process of reading the data stored in the memory of a card is completed.

Figure 8:
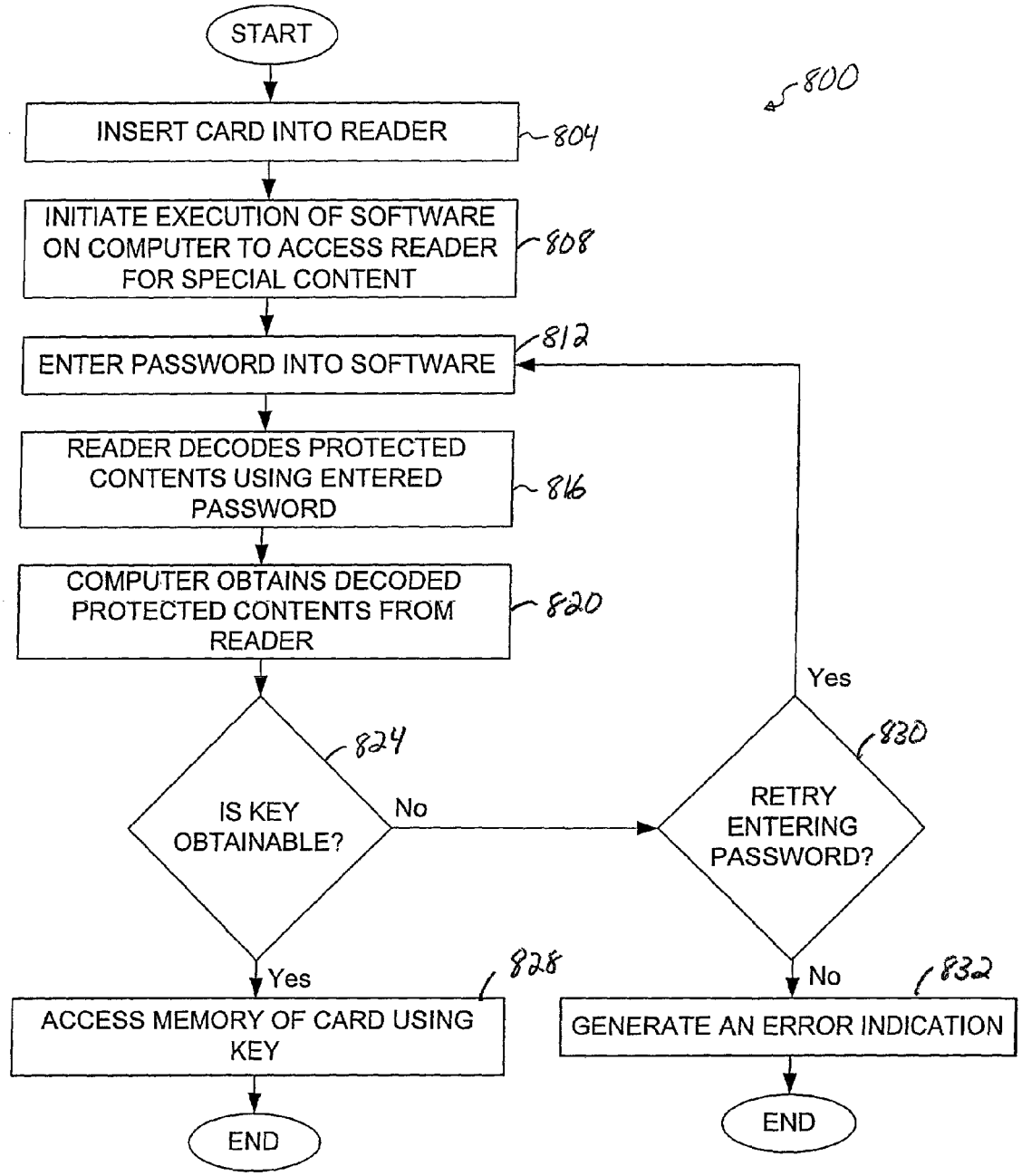
FIG. 8 is a process flow diagram which illustrates the steps associated with one method of accessing a memory card through a reader which stores protected contents and uses the password mechanism in accordance with an embodiment of the present invention.

As described above with respect to FIG. 6, a password mechanism may substantially eliminate the need to store any information relating to a password that protects the protected contents from being stored on the reader. With reference to FIG. 8, the steps associated with one method of accessing a memory card through a reader which stores protected contents and uses the password mechanism will be described in accordance with an embodiment of the present invention. A process 800 begins at step 804 in which a card is inserted into a reader that is capable of storing protected contents and is enabled for use with a password mechanism. Once the card is inserted into the reader, the execution of software on a computer which is in communication with the reader is initiated in step 808.

In step 812, password is entered into the software. The entered password, which is intended to be used to decode the protected or special contents stored on the reader, is entered into the software and downloaded into RAM associated with the reader. After the password is entered, the reader decodes or otherwise processes the protected contents using the entered password in step 816. It should be appreciated that if the entered password is correct, i.e., if the entered password is the same as the password that was used to encode the protected contents, then the protected contents will be decoded properly. However, if the entered password is not correct, then the protected contents generally will not be decoded properly and, as a result, the decoded protected contents may be indecipherable to the extent that any key within the decoded protected contents may not be identified.

Once the protected contents are decoded, the software on the computer obtains the decoded protected contents from the reader in step 820. A determination is then made in step 824 regarding whether the key is obtainable. In other words, a determination is made regarding whether the password entered or provided in step 812 was correct and, hence, whether the decoded protected contents have been decoded properly. If it is determined that the key is obtainable or identifiable, then the memory of the card is accessed in step 828 using the key. The steps associated with accessing the memory of a card to write information into the memory were described above with respect to FIG. 7b, while the steps associated with accessing the memory of a card to read information from the memory were described above with respect to FIG. 7c. After the memory of the card is accessed using the key, the process of accessing memory is completed.

Alternatively, if it is determined in step 824 that the key is not obtainable, the indication is that an incorrect password was entered in step 812. Accordingly, process flow proceeds from step 824 to step 830 in which it is determined whether another attempt is to be made at entering a password. When it is determined that another attempt is to be made at entering a password, process flow returns to step 812 in which a password is entered into software. On the other hand, when it is determined that another attempt is not to be made at entering a password, then an error indication may be generated in step 832, and the process of accessing memory may effectively be terminated.

In general, reader 508 of FIG. 5 and reader 608 of FIG. 6 include a Protected Contents Feature Set which enables readers 508, 608 to store protected contents. An overall system which supports the storage of protected contents on a reader generally supports the Protected Contents Feature set and, hence, includes the ability to recognize commands such as a Check Protected Contents Status command. That is, a Protected Contents Feature Set which enables protected contents to be stored on a reader includes a Check Protected Contents Status command. FIG. 9a is a diagrammatic representation of a command descriptor block for a Check Protected Contents Status command in accordance with an embodiment of the present invention. In the USB environment, the Check Protected Contents Status command is typically built inside a USB command wrapper. The command enables the Protected Contents Feature set, and obtains input data from the reader which serves as a status confirmation. In the event that a reader does not support the Protected Contents Feature set, generally either no data will be returned, or the returned data may not conform to the "55" or "AA" format.

A Check Protected Contents Status command descriptor block 902, as shown in FIG. 9a, generally includes twelve bytes 906, each with eight bits 910. Block 902 is associated with a D3h command code, and is essentially a component of a Small Computer System Interface (SCSI) command that is sent from a host to a USB reader, e.g., from a host to firmware associated with a reader. A byte 906a is arranged to include an operation code, while a byte 906b is reserved. Bytes 906c-j are arranged to contain up to eight bytes of a password. Typically, the password may be encrypted, as for example using a method defined by a user. When a user is prompted to provide a password to a reader, or is prompted to change a password, the user may include a password of up to eight bytes in bytes 906c-j.

A byte 906k includes a bit 910a that is arranged to enable a protected contents device mode. That is, bit 910a of byte 906k is arranged to indicate whether a reader may operate in a protected contents mode, or whether the reader is substantially prevented from operating in protected contents mode. In the described embodiment, bit 910a of byte 906k, or an ENB field, may be set to a value of "1" to indicate that protected contents functionality is enabled. When bit 910a of byte 906k is set to a value of "1," a second bit of byte 57 associated with a standard SCSI INQUIRY data format that is stored in the reader may be set to a value of "1" to indicate that a Protected Contents Feature Set is enabled. In order for a Protected Contents Feature Set to be enabled, a third bit of byte 57 within the standard SCSI INQUIRY data format is generally substantially fixably set to indicate that a Protected Contents Feature Set is supported.

A bit 910b of byte 906k cooperates with bit 910a of byte 906k to further indicate when a protected contents device mode is not enabled. Specifically, when bit 910b and bit 910a of byte 906k are both set to a particular value, e.g., a value of "0," the protected contents device mode is effectively disabled. A bit 910c of byte 906k is a password clearing bit. When a password parameter provided in bytes 906c-j substantially matches a password associated with a reader, and bit 910c of byte 906k is set appropriately, then the password set in the reader may be cleared. After the password is cleared, a new password may be entered with bit 910a of byte 906k set. After the new password is set and, hence, replaces the old password, the contents may substantially only be stored and retrieved through the use of the new password.

Also within byte 906k, a bit 910d is arranged to specify whether or not the contents stored in a reader or the contents to be stored in the reader are encrypted, and whether or not the password stored in the reader is encrypted. For example, when bit 910d of byte 906k is set to a value of "1," the indication may be that the contents and the password are not encrypted. When bit 910d of byte 906k is set to indicate that the contents and the password are encrypted, the contents and the password are generally encrypted before the password and the contents are transferred to the reader. A bit 910e of byte 906k is arranged to define whether an encryption method used to encrypt contents is a CPRM method. If user-defined bit 910g or 910h of byte 906k is set, the password may be encrypted by a user-defined method. It should be understood that when bit 910d of byte 906k indicates that there is no encryption, bit 910d of byte 906k effectively overrides bit 910e of byte 906k, regardless of the value of bit 910e of byte 906k.

Bits 910g, 910h of byte 906k are user-defined bits. In the described embodiment, at least one of bits 910g, 910h of byte 906k may be set to a value of "1" if the type of protected content and encryption are defined by a user. Generally, bit 910e of byte 906k, i.e., the CPRM bit, overrides bits 910g, 910h of byte 906k such that when bits 910e, 910g, 910h are all set to a value of "1," and bit 910d of byte 906k is not set, the assumption is that a CPRM method has been used for encryption. A bit 910f of byte 906k is arranged to indicate whether a password passing mechanism is enabled. Such a password passing mechanism, e.g., the "SanDisk password passing mechanism, was described above with respect to FIG. 8.

Block 902 is typically used to enable a password included in bytes 906c-j to be checked with a password stored in the reader such that when the password in bytes 906c-j matches the password stored in the reader, the protected contents are eligible for a read operation or a write operation. However, block 902 may also be used to set a password stored in the reader. If the reader does not have a current password, block 902 may be used to set a password to be stored in the reader. Alternatively, as mentioned above, if a password is set in the reader, then block 902 may be used to clear the password that is set in the reader, and also to set a new password in the reader. After a new password is set in the reader, in order for subsequent Check Protected Contents Status commands to be accepted, the subsequent Check Protected Contents Status commands generally specify the new password.

A byte 906l is arranged to contain information that may be compared against an expiration date associated with protected contents. For example, byte 906l may include bits 910f-h which store a current year, bits 910c, 910d which store a current month, and bits 910a, 910b which store a current day. The overall current date information contained within byte 908l may be used by the reader to determine if the protected contents have expired and, hence, are still valid.

When a reader receives a Check Protected Contents Status command from a computer, the reader generally returns data to the computer. While the data structure that is returned may be of substantially any format, the format of the returned data structure is generally such that when the computer receives the returned data structure, the computer recognizes that the reader includes the Protected Contents Feature Set. FIG. 9b is a diagrammatic representation of a data structure that may be returned to a host in response to a Check Protected Contents Status command in accordance with an embodiment of the present invention. A data structure 922 includes three bytes 926. A byte 922c is set to "Aah" while a byte 922b is set to "55h."

A byte 926a includes a bit 930a that is arranged to indicate whether a Protected Contents Feature Set is enabled or disabled on the reader. A bit 930b of byte 926a is effectively a "lock" bit which indicates the status of protected contents that are either stored on the reader or are to be stored onto the reader. For example, when bit 930b of byte 926a is set to a value of "1," then the protected contents are locked and, hence, are not retrievable. Alternatively, when bit 930b of byte 926a is set to a value of "0," then the indication is that the protected contents are not locked and, as a result, may be retrieved. It should be appreciated that when bit 930a of byte 926a is set to a value of "0," or otherwise indicates that a Protected Contents Feature Set is not enabled, then the indication is that either the adapter does not support the Protected Contents Feature Set, or that software executing on the computer has disabled the Protected Contents Feature Set. When the computer receives data structure 922 with bit 930a of byte 926a set to a value of "0," the computer generally does not send an Access Protected Comments command, which will be described below with respect to FIGS. 9c and 9d, to the reader.

A bit 930c of byte 926a is a cleared password indicator which indicates whether or not the password that protects the protected contents has been cleared. In the event that the password has been cleared, then the cleared password indicator may be set to a value of "1." Bits 930d-h of byte 926a are arranged to indicate an encryption mechanism that was used to encrypt protected contents currently stored on a reader or protected contents which are to be stored on the reader. A bit 930d of byte 926a may be set to indicate if the protected contents are not encrypted, while bit 930e of byte 926a may be set to indicate if a CPRM encryption method was used to encrypt the protected contents. A bit 930f of byte 926a is arranged to indicate whether a password passing mechanism was used to encrypt the protected contents. One of bits 930g, 930h of byte 926a may be set to indicate a user defined encryption method that was used to encrypt the protected contents. Typically, only one of bits 930d-h of byte 926a may be set for the encryption or decryption of the protected contents. If either bit 930g or 930h is set, the reader may encrypt the password using the user-defined method before storing into its table area, which is described below with reference to FIG. 10. In this case, bit 930e may also be set to indicate that the protected contents are encrypted by a CPRM encryption method. In the event that a reader is unable to determine an encryption mechanism that was used to encrypt the protected contents, none of bits 930d-h may be set, and an "invalid command descriptor block" message or an "illegal request" message may be returned to the computer.

If a CPRM encryption method is used for the encryption and decryption of protected contents, the password may be used as the key for the CPRM encryption method to encrypt and decrypt the contents. As such, the password itself generally may not be decrypted the same way because there is effectively no other key that may be used to encrypt of decrypt the password. The password, instead, as described above, is generally encrypted using a user-defined method, or may not encrypted at all.

After data structure 922 is returned to the computer, a Access Protected Contents command which complies with an ANSI standard may be sent from the computer to the reader in order to access protected contents in the reader. With reference to FIGS. 9c and 9d, Access Protected Contents commands which are suitable for use in writing protected contents onto a reader and reading protected contents from a reader, respectively, will be described. FIG. 9c is a diagrammatic representation of a command descriptor block for an Access Protected Contents command that is suitable for writing protected contents onto a reader in accordance with an embodiment of the present invention. An Access Protected Contents command descriptor block 952 is included in a Protected Contents Command Feature set, and writes protected contents when a bit 960a of a byte 956b is set to indicate a write operation. In the described embodiment, when bit 960a of byte 956d, which is a direction (DIR) bit is set to a value of "0" block 952 is arranged to implement a write operation.

A byte 956a contains an operation code or a command code. As shown, the operation code contained in byte 956a is a D4h operation code. Bits 960b-h of byte 956b and a byte 956f are reserved, as is a byte 956k. The address in a protected contents section of the reader into which new protected contents are to be written is provided in bytes 956c-f. That is, bytes 956c-f provide a byte offset in the protected contents section, e.g., area or table, for data to be stored on the reader. That is, the address in bytes 956c-f may identify an offset from the beginning of the protected contents section or table. The format of the protected contents section will be described below with respect to FIG. 10. A most significant byte (MSB) of the protected content address may be contained in byte 956c, while a least significant byte (LSB) of the protected content address may be contained in byte 956f.

Bytes 956g-j are arranged to contain a data transfer length, i.e., a length of data that is to be transferred into the protected contents section of the reader. The data transfer length may be expressed in bytes as essentially the total number of bytes which are to be written into the protected contents section of the reader. A byte 9561 is arranged to include an overall expiration date. That is, an overall expiration date for contents which are to be stored into the protected contents section of the reader may be stored with the contents. An overall expiration date may be stored in a reserved byte 9561 and, in one embodiment, the overall expiration date may include an expiration year, an expiration month, and expiration day. Such an expiration date is typically included in contents which are to be written into a reader. It should be appreciated that when an overall expiration date is not included in the contents, then the protected content effectively do not expire, e.g., the protected contents remain valid until the protected contents are overwritten.

FIG. 9d is a diagrammatic representation of a command descriptor block for an Access Protected Contents command that is suitable for reading protected contents from a reader in accordance with an embodiment of the present invention. An Access Protected Contents command descriptor block 972 has substantially the same format as block 952 of FIG. 9c. The setting of a DIR bit within block 972 substantially distinguishes block 972 from block 952 of FIG. 9c. That is, a DIR bit indicates whether a particular Access Protected Contents command is arranged to write data to a protected contents section of a reader or to read data from a protected contents section of the reader.

In the described embodiment, when bit 980a of byte 976b which is a DIR bit is set to a value of "1," then block 972 is arranged to implement a read operation. It should be appreciated that if 980a of byte 976b is set to a value of "0" then block 972 is arranged to implement a write operation, and is effectively the same as block 952 of FIG. 9c. A byte 976a contains an operation code or a command code, while a byte 976k and a byte 976f are reserved, as are bits 980b-h of byte 976b.

The address in a protected contents section of the reader from which protected contents are to be read is provided in bytes 976c-f. Specifically, bytes 976c-f provide a byte offset in the protected contents section which identifies where contents to be read from the reader are located. Bytes 976g-j are arranged to contain a data transfer length, i.e., a length of data that is to be transferred from the protected contents section of the reader. A byte 9761 may be arranged to include an overall current date.

In general, an overall current date that may be used for comparison purposes with an overall expiration date for contents that are to be read from the protected contents section of the reader may be provided by a host to a reader. The current date may be used to determine whether access to the protected contents may be allowed. For example, if it is determined using the overall current date that the overall expiration date has passed, access to the protected contents may be substantially denied. The protected contents may even be erased, in some cases, if it is determined that the overall expiration date has passed. Alternatively, if it is determined that the overall expiration date has passed based on a comparison with the current date provided by the host, some of the protected contents may be read, or even all of the protected contents may still be read. In other words, the use of an overall current date may be optional.

A protected contents section of a reader, which may be a part of a memory located within the reader, may generally have substantially any suitable format. One suitable format for protected contents within a reader will be described with respect to FIG. 10 in accordance with an embodiment of the present invention. A protected contents format 1000 may include any number of bytes. In the described embodiment, format 1000 includes approximately 512 bytes. Bytes included in a first byte group 1006*a* are arranged to include the protected contents, e.g., protected contents may be stored in bytes 0 through 479 of format 1000. Often, the protected contents in first byte group 1006 may be provided by a vendor. Bytes included in a second byte group 1006*b* are arranged to include a manufacturer identifier. That is, second byte group 1006*b* stores bytes in ASCII which effectively identify a vendor or a manufacturer of the reader.

As described above with respect to FIG. 9*c*, when an Access Protected Contents command to write contents into a protected contents section of a reader is sent from a computer to the reader, the command typically includes an overall expiration date. The overall expiration date may be stored into bytes 1006*c-e* in response to an Access Protected Contents command. The expiration date stored in bytes 1006*c-e* may be accessed in response to a Check Protected Contents Status command or an Access Protected Contents command to read data, i.e., the expiration date stored in bytes 1006*c-e* may be compared against a current date provided by either a Check Protected Contents Status command or an Access Protected Contents command to read data. It should be appreciated that if protected contents require more bytes than available in first byte group 1006*a*, the expiration date in bytes 1006*c-e* may be set by the later of the contents and the value provided by an Access Protected Contents command. Since the expiration date in bytes 1006*c-e* may effectively be set by contents written into the protected contents section of a reader, when a user wishes to change the expiration date in bytes 1006*c-e*, new contents which include the changed expiration date are provided by the user. When a user prefers that contents substantially never expire, the user may set the expiration date in bytes 1006*c-e* to a relatively large year value, e.g., year 3000, by providing new contents which include the expiration date.

A third byte group 1006*f* is reserved, while a fourth byte group 1006*g* in arranged to hold an encrypted password. In the described embodiment, the password stored in fourth byte group 1006*g* may include up to approximately eight bytes. The password stored in fourth byte group 1006*g* may be encrypted or unencrypted. The password is generally encrypted if protected contents stored in first byte group 1006*a* are encrypted and if bit 910*d* of byte 906*k* of a Check Protected Contents status command of FIG. 9*a* indicates that the password is encrypted.

A fifth byte group 1006*h* is arranged to contain a content updating counter. While the content updating counter is generally initialized to zero, the content updating counter is incremented each time an update is made with respect to format 1000. For example, when an Access Protected Contents command to write protected contents such as Access Protected Contents command 952 of FIG. 9*c* with a DIR bit set to a value of "0," the content updating counter is incremented by one to indicate that the protected contents in first byte group 1006*a* have been updated. Typically, content updating counter has an upper limit, e.g., the maximum number of times format 1000 may be written to is substantially limited. In one embodiment, while the upper limit may be widely varied, the upper limit on the number of times format 1000 may be written to is generally approximately 65,535 or less. Once the upper limit is reached, an attempt to write to format 1000 using an Access Protected Contents command may effectively be unsuccessful.

When there is a concern that SCSI bus analyzers which may peek at USB bus activities may be in use, a host may encrypt contents using a password before sending the contents to the reader to be stored in the protected contents section of the reader. Such encryption may enable a key to be effectively hidden from a potential unauthorized user or hacker. It should be appreciated that encrypting data before placing the data on a bus between a host and a reader, while not required, may often be desirable. The data that may encrypted is typically data stored in first byte group 1006*a*. The host may encrypt the data using a password, and firmware on the reader may further encrypt the data before storing the data into first byte group 1006*a*. Typically, the data stored in byte groups 1006*b-e* is plain or raw data.

In one embodiment, third byte group 1006*f* is generally a reserved area which may be used to check the correctness of a password. A reader may encrypt an identifier stored in second byte group 1006*d*, and store the encrypted identifier into third byte group 1006*f* to enable the correctness of a password to be checked as described above with respect to the system of FIG. 6. Because there is effectively no password stored in format 1000, the encrypted identifier may be used to check the password. It should be understood that while the reader may be able to determine that the password is incorrect, the reader is generally unaware of the correct password.

Although only a few embodiments of the present invention have been described, it should be understood that the present invention may be embodied in many other specific forms without departing from the spirit or the scope of the present invention. By way of example, while a reader has generally been described as being a USB reader, the reader may be substantially any suitable reader or adapter which allows a memory card to communicate with a host system. Other suitable readers include, but are not limited to, PC card readers.

In general, while contents of a reader have been described as being protected, it should be appreciated that the contents of the reader may not necessarily be protected. That is, the contents of a reader may not necessarily be encrypted. When the contents of a reader are not encrypted, the contents of the reader may be arranged such that when any keys stored in the reader may be accessible as long as software on a computer host which communicates with the reader has the capability to locate a location within the reader in which the key is stored.

The bits and the words associated with various functions and command descriptors may vary widely. In other words, specific bits or words which are set a certain way in command descriptor blocks to indicate different states associated with the blocks may vary. For instance, the bit that is set to indicate that a Protected Contents Feature set is supported and the bit that is set to enable a Protected Contents Feature set may generally vary. Substantially any bit may be set as long as the overall system is aware of which bit is to be set to indicate that the Protected Contents Feature Set is supported and which bit is set to indicate that the Protected Contents Feature Set is enabled.

The host has been described as being in communication with a reader that is in communication with a memory card. Although the host and the reader may be substantially separate entities, i.e., the reader may be a peripheral device which may be readily attached to and detached from the host, it should be understood that the reader may also be a part of the host. For instance, the reader may be an integral part of the host that may not be easily attached to or detached from the host.

A password mechanism has generally been described as enabling a password to be provided to a RAM on a reader, then used to decode protected contents on the reader such that the decoded protected contents are provided to a host irregardless of whether the password was valid. In one embodiment, a password mechanism may be arranged to provide the decoded protected contents substantially only if the provided password is valid. Such a password mechanism may, for example, be arranged to be used in conjunction with protected contents which include a predetermined field which includes a flag that, when the protected contents are properly decoded, has a particular value which may be checked by the reader to determine of the password was valid.

In general, the steps associated with the various processes of the present invention may be widely varied. Steps may be reordered, altered, added, and removed without departing from the spirit or the scope of the present invention. By way of example, the steps associated with accessing the memory of a memory card using a password mechanism on a reader may include steps associated with determining if the password mechanism is actually supported by the reader. Therefore, the present examples are to be considered as illustrative and not restrictive, and the invention is not to be limited to the details given herein, but may be modified within the scope of the appended claims.

What is claimed is:

1. A method for accessing encrypted information stored in a flash memory storage device, by operating a host system in communication with a reader, the reader including a memory storing a key according to which the information stored in the flash memory storage device is encrypted, the method comprising:
    inserting the flash memory storage device into the reader;
    forwarding an access code from the host system to the reader;
    responsive to the access code being valid for the reader, obtaining the key from the reader; and
    decrpyting the information stored on the flash memory storage device using the key; and
    forwarding the decrypted stored information to the host system.

2. The method of claim 1, further comprising:
    encrypting information using the key;
    storing the encrypted information in the flash memory storage device; and
    removing the flash memory storage device from the reader.

3. The method of claim 1, wherein the access code comprises a first password;
    and wherein the obtaining step comprises::
    decoding contents stored in the reader to obtain the key from the decoded contents using the first password, responsive to determining that the first password is valid, to obtain the key from the decoded contents.

4. The method of claim 3, further comprising:
    comparing the first password to a second password to determine whether the first password matches the second password, wherein the second password is stored in the reader.

5. The method of claim 1, wherein the access code comprises a first password;
    and wherein obtaining the key from the adapter includes:
    operating the reader to obtain a second password using the first password; and
    decoding contents stored in the reader using the second password, responsive to the second password is suitable for decoding the contents associated with the adapter, wherein the contents include the key.

6. The method of claim 1, wherein the reader includes a volatile random access memory (RAM), and wherein the step of obtaining the key includes:
    decoding contents stored in the volatile RAM using the access code to obtain the key from the decoded contents.

7. The method of claim 1, wherein the flash memory storage device is one selected from the group consisting of a secure digital card, a Compact Flash card, a multimedia card, a smart media card, and a Memory Stick card.

8. The method of claim 1, wherein the reader is one of a Universal Serial Bus (USB) reader and a Personal Computer Memory Card International Association (PCMCIA) adapter.

9. A system comprising:
    a host system; and
    a flash memory reader coupled to the host system, comprising
        an interface for receiving a flash memory storage device,
        a reader memory, for storing a key:
        circuitry for accessing encrypted information stored in a flash memory device received at the interface, comprising:
            means for receiving an access code from the host system, and
            means for obtaining the key from the reader memory responsive to the received access code being valid for the reader; and
            means for decrypting information stored on a flash memory storage device received at the interface, using the key.

10. The system according to claim 9, wherein the means for obtaining the key comprises:
    means for comparing a first password corresponding to the received access code to a second password that is stored in ther reader memory; and
    means for obtaining the key using the second password responsive to the first password matching the second password.

11. The system according to claim 10, wherein the means for obtaining the key further comprises:
    means for obtaining a second password using the first password and wherein the means for obtaining the key uses the second password responsive to the second password being suitable for obtaining the key.

12. The system according to claim 10, wherein the reader memory comprises a volatile random access memory (RAM) for storing the received first password,
    and wherein the means for obtaining the key comprises:
        means for decoding the encoded contents of the reader memory using the first password.

13. The system according to claim 9, wherein the host system is arranged to encrypt information and to write the encrypted information into the memory through the reader.

14. The system according to claim 9, wherein the host is arranged to read information from the memory through the reader and wherein the decrypting means is contained within the host system.

15. The system according to claim 13 wherein the flash memory storage device is a memory card containing a non-volatile memory.

16. The system according to claim 15, wherein the memory card is one selected from the group consisting of a secure digital card, a Compact Flash card, a multimedia card, and a Memory Stick card.

17. The system according to claim 9, wherein the reader is one of a Universal Serial Bus (USB) reader and a Personal Computer Memory Card International Association (PCMCIA) adapter.

* * * * *

UNITED STATES PATENT AND TRADEMARK OFFICE
CERTIFICATE OF CORRECTION

PATENT NO.       : 7,552,345 B2                                       Page 1 of 1
APPLICATION NO.  : 10/092049
DATED            : June 23, 2009
INVENTOR(S)      : Robert C. Chang et al.

It is certified that error appears in the above-identified patent and that said Letters Patent is hereby corrected as shown below:

In the Claims

In column 17, claim 3, line 36, after "obtaining step comprises" delete ":" (second occurrence).

In column 18, claim 10, line 27, after "stored in" replace "ther" with --the--.

Signed and Sealed this

Third Day of November, 2009

David J. Kappos
*Director of the United States Patent and Trademark Office*